(12) United States Patent
Davies et al.

(10) Patent No.: US 10,981,591 B2
(45) Date of Patent: Apr. 20, 2021

(54) REACH ADJUSTABLE STEERING COLUMN ASSEMBLY

(71) Applicants: TRW Limited, Solihull (GB); TRW Automotive GmbH, Alfdorf (DE)

(72) Inventors: Niclas Davies, Birmingham West Midlands (GB); Milos Krivan, Moravske Budejovice (CZ)

(73) Assignees: ZF Automotive Germany GmbH, Alfdorf (DE); ZF Automotive UK Limited

( * ) Notice: Subject to any disclaimer, the term of this patent is extended or adjusted under 35 U.S.C. 154(b) by 99 days.

(21) Appl. No.: 16/341,095

(22) PCT Filed: Oct. 12, 2017

(86) PCT No.: PCT/GB2017/053084
§ 371 (c)(1),
(2) Date: Apr. 11, 2019

(87) PCT Pub. No.: WO2018/069711
PCT Pub. Date: Apr. 19, 2018

(65) Prior Publication Data
US 2020/0189646 A1  Jun. 18, 2020

(30) Foreign Application Priority Data

Oct. 12, 2016 (GB) ...................... 1617337

(51) Int. Cl.
*B62D 1/185* (2006.01)
*B62D 1/184* (2006.01)
*B62D 1/19* (2006.01)

(52) U.S. Cl.
CPC ............. *B62D 1/185* (2013.01); *B62D 1/184* (2013.01); *B62D 1/192* (2013.01)

(58) Field of Classification Search
CPC ......... B62D 1/185; B62D 1/184; B62D 1/192
See application file for complete search history.

(56) References Cited

U.S. PATENT DOCUMENTS 6,769,715 B2    8/2004 Riefe et al.
10,343,707 B2 *  7/2019 Kreutz ................... B62D 1/195
(Continued)

FOREIGN PATENT DOCUMENTS

DE    102009059159 B3    1/2011
DE    102016104951 A1    9/2016
(Continued)

OTHER PUBLICATIONS

Patents Act 1977: Search Report under Section 17(5), Application No. GB1617337.9, dated Apr. 10, 2017.
(Continued)

*Primary Examiner* — Faye M Fleming
(74) *Attorney, Agent, or Firm* — Robert James Harwood

(57) ABSTRACT

A reach adjustable steering column assembly comprises a telescopic steering shaft which in use supports a steering wheel of the vehicle; a shroud that supports the steering shaft comprising an upper shroud part and a lower shroud part, the upper shroud part moving telescopically relative to the lower part during reach adjustment of the steering column assembly, a support bracket that supports the shroud relative to the vehicle body, and a clamp mechanism that is operable between an unclamped position in which the steering column assembly is adjustable for reach and a clamped position in which the reach position of the steering column assembly is fixed. The clamp mechanism comprises a first locking part that is displaceable by an actuator assembly into and out of positive engagement with a second locking part. An energy absorbing mechanism acts between the upper shroud part and the second locking part and is configured so that during a crash a deformable part of the energy absorbing mecha-
(Continued)

nism is plastically deformed by a deforming part, thereby controlling the movement of the upper shroud part, and in that one of the deformable element and the deforming portion of the energy absorbing mechanism is secured to the upper shroud part, and the other is fixed relative to the second locking part.

16 Claims, 7 Drawing Sheets

(56) References Cited

U.S. PATENT DOCUMENTS

2003/0075912 A1    4/2003   Riefe et al.
2012/0126522 A1    5/2012   Tinnin et al.

FOREIGN PATENT DOCUMENTS

| GB | 2291840 A | 2/1996 |
| WO | 2016146331 A1 | 9/2016 |

OTHER PUBLICATIONS

PCT International Search Report and Written Opinion, Application No. PCT/GB2017/053084, dated Jan. 2, 2018.

\* cited by examiner

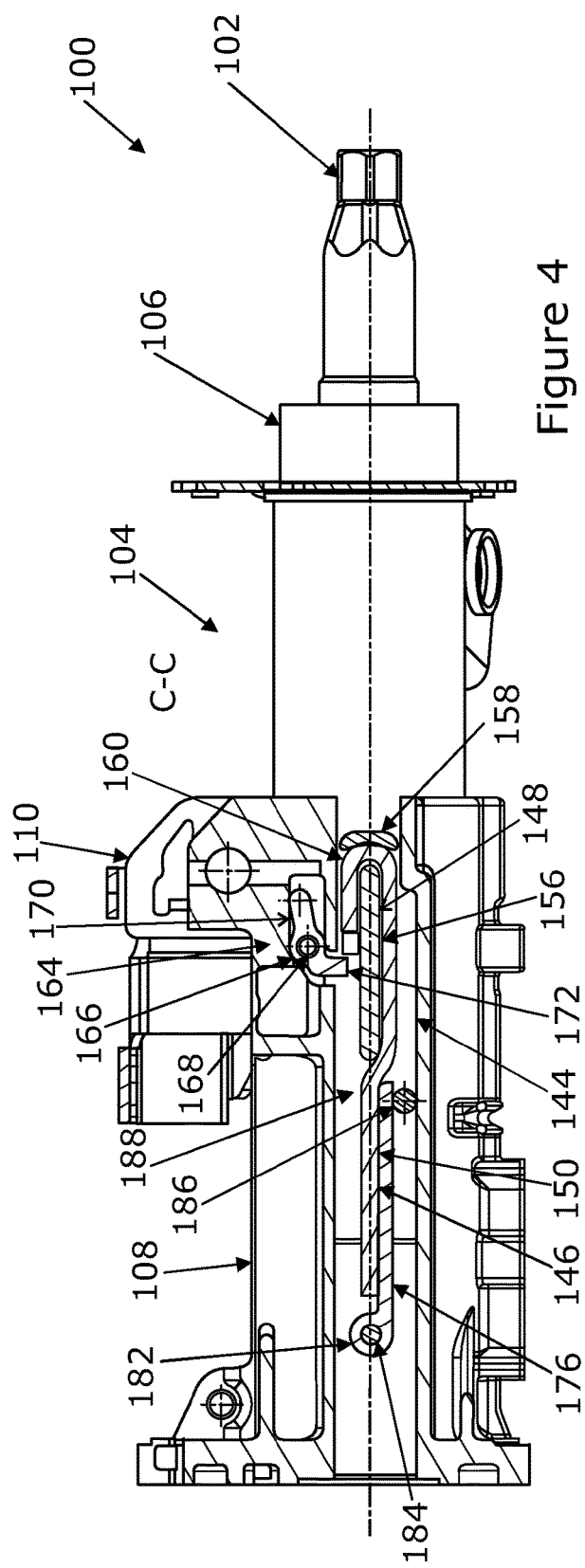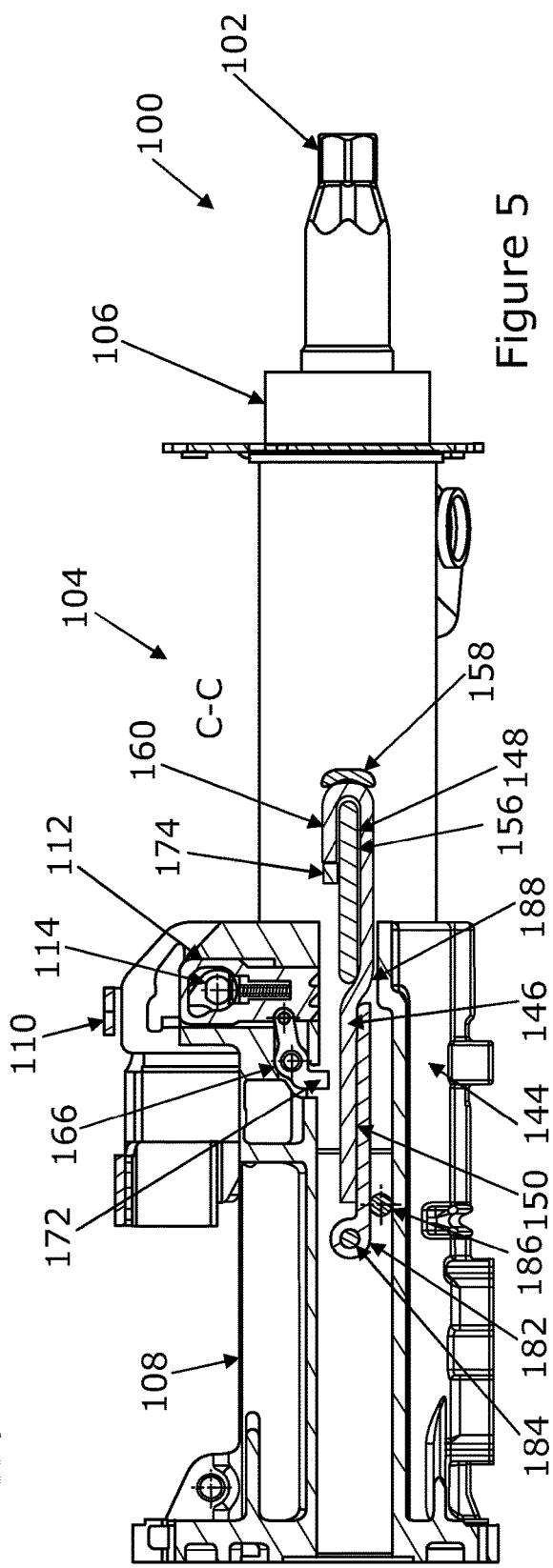

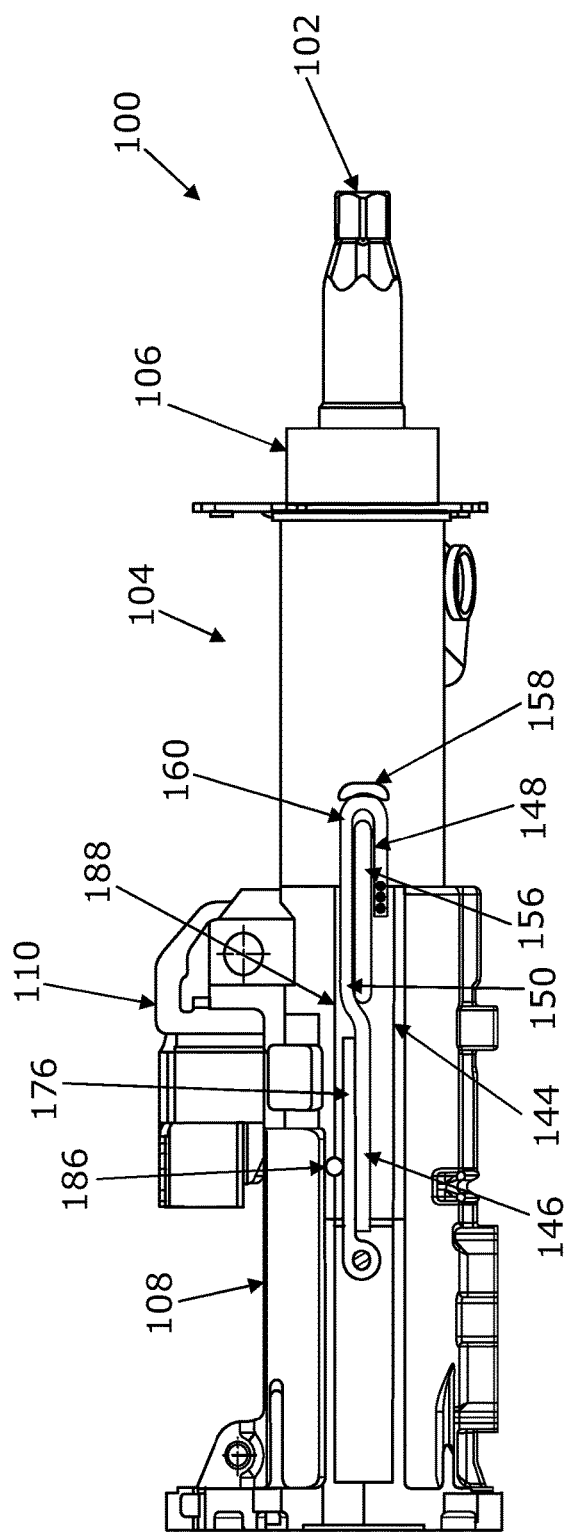
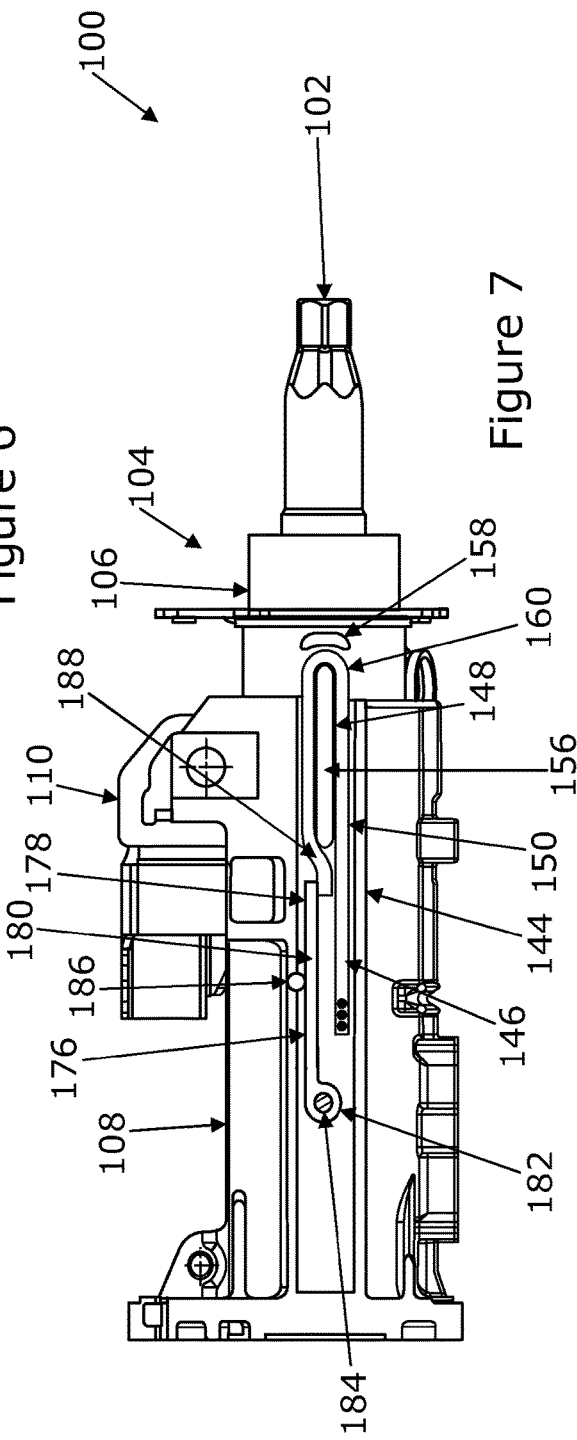

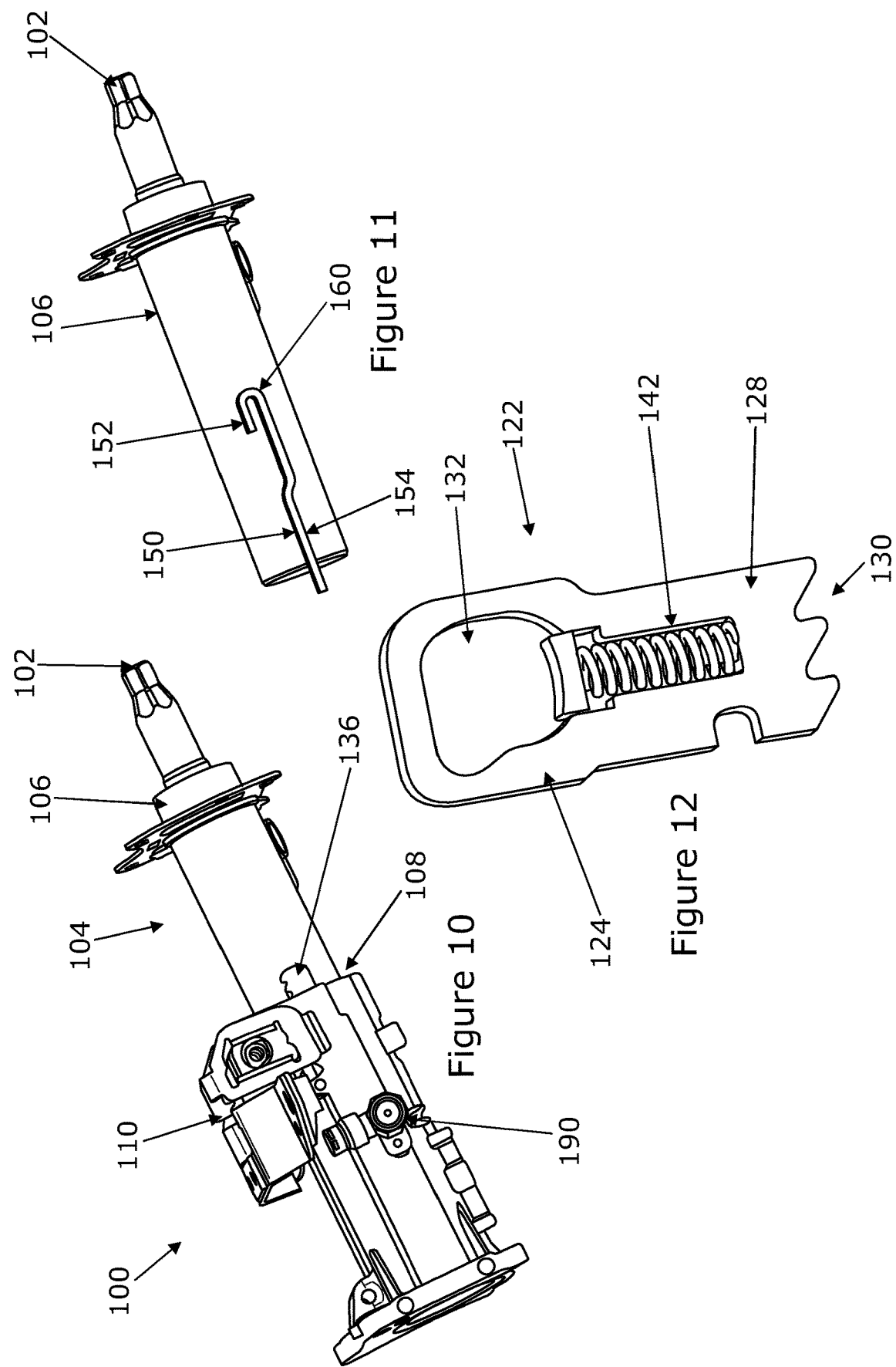

REACH ADJUSTABLE STEERING COLUMN ASSEMBLY

CROSS-REFERENCE TO RELATED APPLICATIONS

This application is a national stage of International. Application No. PCT/GB2017/053084, filed 12 Oct. 2017, the disclosures of which are incorporated herein by reference in entirety, and which claimed priority to Great Britain Patent Application. No. 1617337.9, filed 12 Oct. 2016, the disclosures of which are incorporated herein by reference in entirety.

BACKGROUND TO THE INVENTION

This invention relates to improvements in reach adjustable steering column assemblies for vehicles.

A typical steering column assembly for a vehicle comprises a steering shaft that connects to a steering wheel at one end and a steering gear at the other. Rotation of the steering gear rotates the steering shaft, which in turn operates the steering gear to turn the road wheels of the vehicle. The steering gear may comprise rack and pinion gearbox which converts the rotation of the steering shaft into a reciprocating motion of the steering rack. The steering may be electrically assisted by a motor which acts upon the steering shaft, or the steering gear or rack.

The steering shaft is supported in a shroud, typically by a pair of bearing assemblies located at spaced positions along the shaft. The shroud is fixed to the vehicle body. In some cases, the vehicle manufacturer may specify that the steering wheel should be adjustable for reach or rake or both. Reach adjustment can be achieved by providing a two part telescopic steering shaft, located within a two part telescopic steering column shroud. An upper part of the shaft nearest the steering wheel may slide telescopically over or into a lower part of the steering shaft furthest from the steering wheel. At the same time an upper part of the shroud may slide into or over a lower part of the shroud. A locking mechanism fixes the length of the shroud, which may include some form of positive engagement or may rely on friction alone.

A further requirement of a steering system for most modern vehicles is to control the movement of the steering wheel during a vehicle crash which forces the driver onto the steering wheel. In the case of a front impact at high speed where the driver is not restrained by a seatbelt, the driver can strike the wheel with a very high force of up to, say, 9 kN. This will tend to cause the steering shaft and shroud to collapse. By controlling this collapse it is possible to absorb the energy and minimize the forces applied to the driver compared with a situation where the collapse is uncontrolled during initial collapse but the stops suddenly as the available range of movement runs out.

To control the movement during a crash it is known to provide an energy absorption mechanism which includes a deformable member that deforms during collapse of the steering, such as a strap that is forced around an anvil. The act of deforming the strap absorbs the energy in a controlled manner. The design of a suitable energy absorption mechanism for a reach adjustment steering column is quite complex, as it must perform satisfactorily over a range of different reach in and reach out positions of the steering wheel.

SUMMARY OF THE INVENTION

It is a feature of the present invention to provide a reach adjustable steering column assembly that ameliorates some of the problems present in prior art systems.

According to a first aspect the invention provides a reach adjustable steering column assembly comprising:

a telescopic steering shaft which in use supports a steering wheel of the vehicle;

a shroud that supports the steering shaft comprising an upper shroud part and a lower shroud part, the upper shroud part moving telescopically relative to the lower part during reach adjustment of the steering column assembly, a support bracket that supports the shroud relative to the vehicle body, and a clamp mechanism that is operable between an unclamped position in which the steering column assembly is adjustable for reach and a clamped position in which the reach position of the steering column assembly is fixed, in which the clamp mechanism comprises a first locking part that is displaceable by an actuator assembly into and out of positive engagement with a second locking part, the first and second locking parts being engaged in the clamped position and disengaged in the unclamped condition, the first locking part being fixed to one of the lower shroud part and the support bracket, and the second locking part during normal use being fixed to the upper shroud but during a crash the second locking part being free to move relative to the upper shroud, an energy absorbing mechanism that acts between the upper shroud part and the second locking part and is configured so that during a crash whereby the upper shroud portion moves telescopically relative to the lower shroud part with the clamp assembly in the clamped position a deformable part of the energy absorbing mechanism is plastically deformed by a deforming part, thereby controlling the movement of the upper shroud portion, and in that one of the deformable element and the deforming portion of the energy absorbing mechanism is secured to the upper shroud portion, and the other is fixed relative to the second locking part.

The invention provides an arrangement in which, during reach adjustment, the two parts of the energy absorbing mechanism move together with the upper shaft and with the second locking part, becoming fixed when the assembly is clamped. This allows an assembly to be provided in which the energy absorbing mechanism functions identically for all reach in and reach out positions, giving predictable control of the collapse during a crash. It also allows for a reduction in parts as the energy absorption mechanism and the second locking part can be combined.

The second locking part may be fusibly attached to the upper shroud part, through welding or otherwise. The second locking part may be fixed in position relative to the upper shroud part during normal use by the energy absorbing mechanism. This may be the sole fixing of the second locking part to the upper shroud part. The second locking part may also, or alternatively, be fixed to the upper shroud part by a frangible connector which prevents the energy absorbing mechanism being accidentally activated during reach adjustment but breaks in the event of a crash to allow relative movement between the upper shroud part and the second locking part whereby the energy absorbing mechanism can be activated.

Preferably the energy absorbing mechanism is arranged so that, during collapse, the deformable part is fixed to the upper shroud part and the deforming part is fixed to the second locking part.

The deformable part may comprise a plastically deformable strap that is fixed at a leading end to the upper shroud part and has a trailing part that loops around an anvil defined by the deforming part, during collapse the upper shroud part causing the leading part of the strap to drag the trailing part around the anvil causing the strap to plastically deform.

The strap may comprise a flat strip or a wire, the wire having a square or rectangular or circular or other cross-section. It may comprise a metal strip or wire.

The deforming part may be fixed to or an integral part of the second locking part. For example the second locking part may comprise a block or plate that has the second set of teeth formed in one region and at least one anvil around which the strap is pulled formed at other regions, the anvil forming the deforming part.

The anvil may be provided on a side of the plate or block facing the shroud, so that the deformable part is retained in a channel formed by the side of the plate and the side of the shroud and the anvil.

A guide may be provided, fixed to the second locking part, which guides the strap around the anvil.

The deforming part may include a second anvil that can be moved relative to the first anvil to change the path around which the strap is dragged. For example, the deforming part may comprise a second anvil around which the strap is deformed during a crash but which can be moved such that the strap is not deformed by the second anvil or is deformed by a greater or lesser amount.

The position of the second anvil may be set by a retractable pin.

The system may include a pyrotechnic device that moves the retractable pin to change the position of the second anvil.

The second anvil may be fixed to or comprise an end portion of a lever that is pivotably fixed to the second locking part.

In a most convenient arrangement, the actuator assembly comprises a bolt that extends horizontally across an upper face of the upper shroud, the bolt being connected to the first locking part through a mechanism that converts rotary movement of the bolt into reciprocal movement of the first locking part.

The first locking part may be provided with a set of teeth on a lower edge, such that rotation of the bolt in a first direction moves the first locking part away from the second locking part and a rotation of the bolt in a second direction moves the first locking part towards the second locking part. On moving away the first locking part may move upwards.

The second locking part may comprise a set of teeth on an upper edge facing the teeth of the first locking part, the teeth engaging when in a fully clamped position to provide a positive lock.

The second locking part may comprise a plate or block that is located on the side of the shroud.

The lower shroud part may comprise a casting, and may include a feature on one side which locates the second locking part such that the second locking part can slide axially relative to the lower shroud part as the upper shroud part is moved telescopically relative to the lower shroud part.

Most conveniently, the second locking part comprise an elongate generally planar body with the anvil protruding from a side facing the shroud and the teeth formed on a top edge.

The teeth may extend along the second locking part over a sufficient length that the teeth of the first locking part always face and can engage some of the teeth of the second locking part for all reach adjustment positions of the steering column assembly.

A locking lever may be provided which enables a user to operate the clamp mechanism by rotating the bolt.

The actuator, for example a bolt, of the clamp mechanism, may be connected to the first locking part by a lost motion mechanism. This allows the bolt to be moved to a fully clamped position in the event that the two sets of teeth do not mesh but come to rest in a tooth-on-tooth position.

A spring may be provided that biases the first locking part away from the bolt towards the second locking part. Thus, if the assembly is locked in a tooth on tooth position, the teeth will be sprung into mesh as soon as the upper shroud moves during a collapse of the steering assembly.

An anti-abuse mechanism may be provided for preventing engagement of the energy absorbing mechanism when the clamping mechanism is in an unclamped position. The anti-abuse mechanism may comprise a rocker arm that pivots around a pivot point having a first arm that extends in one direction from the pivot and engages the first locking part and a locking finger that extends in another direction away from the pivot and moves up and down in opposition to the movement of the first locking part such that when the first locking part is raised the finger is lowered and when the first locking part is lowered the finger is lifted.

The finger of the anti-abuse mechanism may extend downwards to a level below a frangible blocking element that is secured to the second locking part. The anti-abuse blocker, when in the lowered position, may be arranged so that the finger will strike an anti-abuse blocking element when the steering reaches the full reach-in position.

The upper shroud part may fit within lower shroud part, for instance sliding in or out during adjustment for reach.

Other advantages of this invention will become apparent to those skilled in the art from the following detailed description of the preferred embodiments, when read in light of the accompanying drawings.

BRIEF DESCRIPTION OF THE DRAWINGS

FIG. 4 is a view along the section C-C of the assembly of FIG. 1 with the steering unclamped and in a fully reach in position;

FIG. 5 is a view corresponding to the view of FIG. 4 with the steering unclamped and in a fully reach out position;

FIG. 6 is a view corresponding to FIG. 4 showing the assembly in a locked position prior to a crash for a second embodiment which is slightly different to the first embodiment but functionally the same;

FIG. 7 shows the end position of the energy absorbing mechanism after a crash where the strap has been dragged over the anvils;

FIG. 10 is a perspective view of the steering column assembly of FIG. 1;

FIG. 11 shows the upper shroud portion and the attached strap of the energy absorbing mechanism separated from the rest of the assembly, the strap being in a pre-crash condition; and FIG. 12 shows in more detail the first locking part and the spring that biases it towards the second locking part.

DETAILED DESCRIPTION OF THE INVENTION

Figure 1:
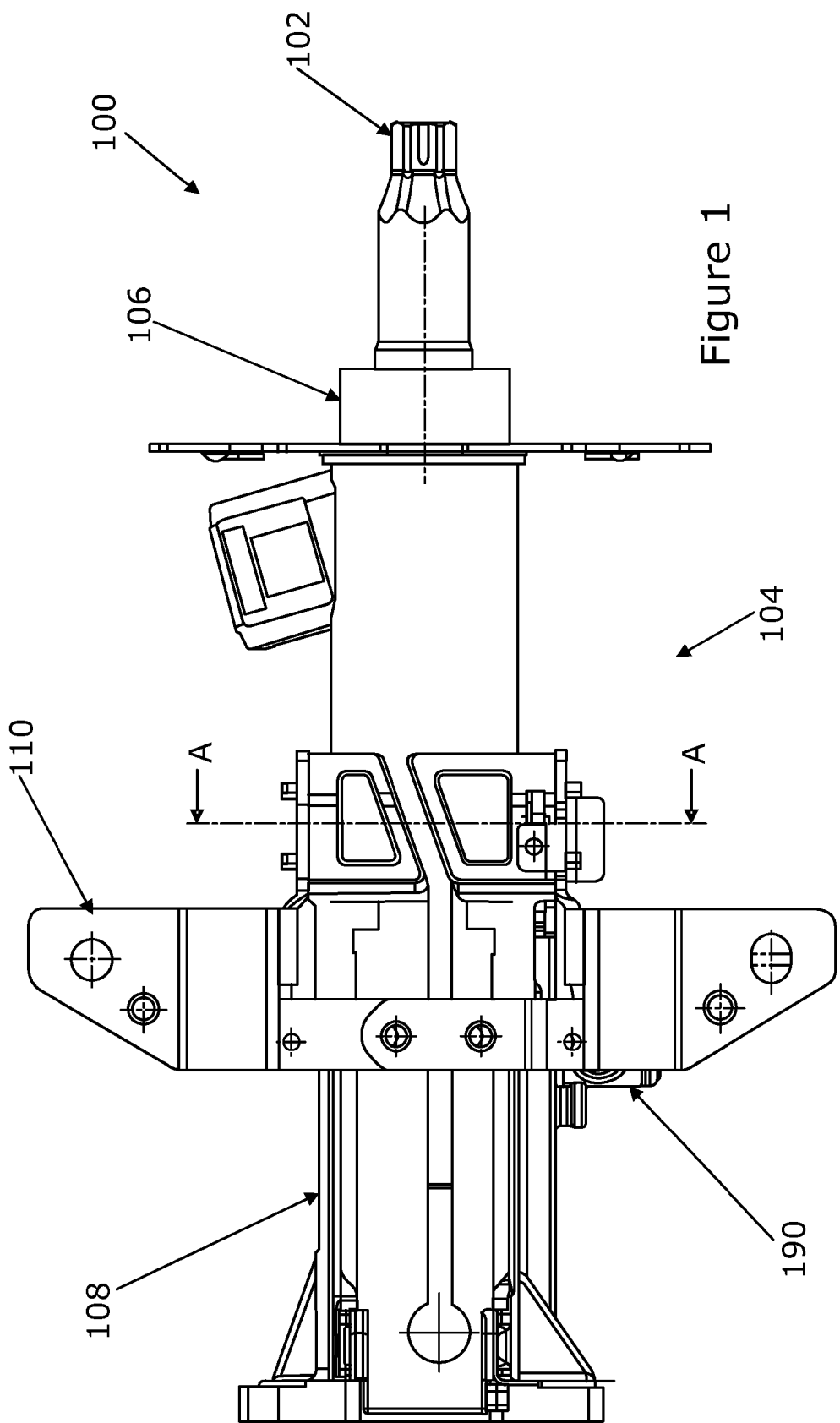
FIG. 1 is a view from above of an embodiment of a steering assembly in accordance with the present invention.
Figure 2:
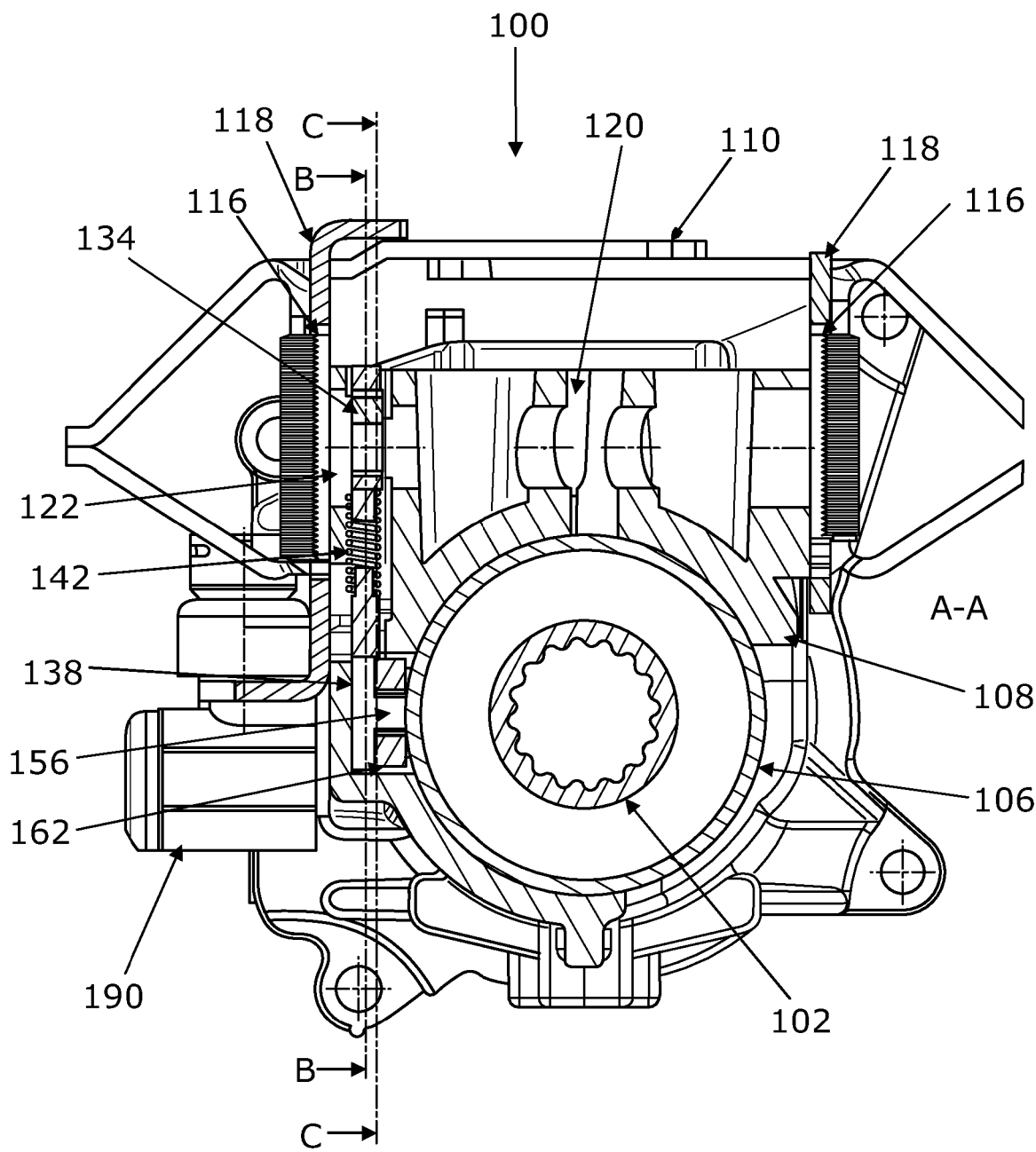
FIG. 2 is a view along the section A-A of the assembly of FIG. 1.

FIG. 10 shows in perspective an embodiment of a steering column assembly 100 in accordance with the present invention. FIGS. 1 and 2 show the reach adjustable steering column assembly 100 viewed from directly above and in cross section along the line A-A in FIG. 1. FIG. 2 onwards show the assembly 100 from one side along section lines B-B or C-C taken from FIG. 2.

The assembly 100 comprises a telescopic steering shaft having an upper part 102 and a lower part (not shown), the upper part 102 supporting a steering wheel (not shown) of the vehicle. A two part telescopic shroud 104 supports the steering shaft. The shroud comprises an upper shroud part 106 and a lower shroud part 108, the upper shroud part 106 moving telescopically relative to the lower shroud part 108 during reach adjustment of the steering column assembly 100. FIG. 11 shows the upper shroud part 106 in perspective isolated from the lower shroud part 108 for clarity.

The shroud 104 is fixed to a gearbox assembly at the end furthest from the steering which locates that end in a manner that allows the shroud 104 to pivot for rake adjustment of the steering wheel. Further support is provided by a support bracket 110 that supports the shroud 104 relative to the vehicle body. This bracket 110 is located approximately midway along the shroud 104 as shown and is generally aligned with the end of the lower shroud part 108 that is nearest the steering wheel.

The steering assembly 100 can be adjusted for both rake and reach and this is controlled by a clamp mechanism 112 that is operable between an unclamped position in which the steering column assembly 100 is adjustable for reach and a clamped position in which both the reach position and rake position of the steering column assembly 100 is fixed and an unclamped position in which both reach and rake can be adjusted. During rake adjustment, which is optional, the shroud 104 can move relative to the bracket 110. The clamp mechanism 112 can best be seen in FIG. 3.

The clamp mechanism 112 comprises an actuator in the form of a clamp bolt 114 that is operated by a lever (not shown) that acts on an end of the bolt 114. The bolt 114 extends across an upper face of the shroud 104, being located within slots 116 within downwardly extending arms 118 of the support bracket 110 and also passing through a guide rail 120 secured to the upper edge of the lower shroud part 108 (visible in FIG. 2). This arrangement means that the shroud 104 will be suspended from the bracket 1110 by the bolt 114. The slots 116 in the bracket arms 118 permit the bolt 114 to move up and down when unclamped to achieve rake adjustment of the assembly 100.

The bolt 114 is connected to a first locking part 122 which comprises a block 124 that can slide up and down in a guide 126 secured to the lower shroud part 108. This can be seen mostly clearly in FIG. 12. The first locking part 122 comprises a flat plate 128 that has a set of teeth 130 on a lowermost edge and a hole 132 towards an upper edge through which the bolt 114 passes as shown in FIGS. 2 to 9.

The hole 132 is oversized, and located within the hole 132 and secured to the bolt 114 is a cam 134. Rotation of the bolt 114 rotates the cam 134 which in turn drives the first locking part 122 up or down in the guide 126 depending on the direction of rotation. A second locking part 136 in the form of an elongate plate 138 is located along one side of the shroud 104, which carries on an upper edge a set of teeth 140 that face the teeth 130 of the first locking part 122. When the first locking part 122 is lowered the two sets of teeth 130, 140 can engage to provide a positive lock between the two locking parts 122, 136 and when raised they are spaced apart to permit relative movement. As will be described later, the second locking part 136 can move with—and is fixed to—the upper shroud part 106 during adjustment of the assembly 100 for reach so that when clamped it prevents further reach adjustment but in the event of a crash this second locking part 136 can move relative to the upper shroud part 106 (in fact it stays still as the upper shroud part 106 moves) to allow for controlled collapse of the shroud 104.

The applicant has appreciated that it is possible for the tips of the teeth 130 of the first locking part 122 to be precisely aligned with the tips of the teeth 140 of the second locking part 136 as it is moved to the clamped position. This is a so-called tooth on tooth condition. To accommodate this, the connection between the first locking part 122 and the bolt 114 includes a lost motion element due to the shape of the cam 134 and the hole 132, and a spring 142 is provided which biases the first locking part 122 downwards away from the bolt 114. This means that the bolt 114 can be moved to the fully locked position without damaging the teeth 130, 140 and, in the event of a crash leading to relative movement between the first and second locking parts 122, 136 the teeth 130, 140 will be driven together as soon as the tooth to tooth tip contact is cleared. From that point on, the positive locking is achieved.

To control kinetic energy during a crash the assembly 100 includes an energy absorbing mechanism 144. This comprises a deformable part 146 and a deforming part 148, the two configured so that during a crash whereby the upper shroud part 106 moves telescopically relative to the lower shroud part 108 with the clamp mechanism 112 in the clamped position the deformable part 146 of the energy absorbing mechanism 144 is plastically deformed by the deforming part 148, thereby controlling the movement of the upper shroud part 106.

As shown in FIG. 4 onwards, and clearly shown in FIG. 11, the deformable part 146 of the energy absorbing mechanism 144 comprises a wire 150 of square cross section that is secured by a weld 152 at one end to the upper shroud part 106, and has a tail part 154 that extends along the shroud 104 away from the steering wheel and is wrapped around the deforming part 148 of the energy absorbing mechanism 144. The wire 150 is of plastically deformable material such as steel.

The deforming part 148 of the energy absorbing mechanism 144 can be seen in FIG. 4 onwards and comprises an anvil 156 that is molded into a side of the second locking part 136 close to the end nearest the steering wheel that faces the shroud 104 and a guide 158 that helps guide the wire 150 around the anvil 156. The guide 158 is also molded into the side of the second locking part 136. Because the wire 150 is welded to the upper shroud part 106 and wraps around the anvil 156 this holds the second locking part 136 in a fixed position relative to the upper shroud part 106 during normal use. The end of the wire 150 has a hook 160 so that the part that is welded to the upper shroud part 106 is located further from the steering wheel than the anvil 156, which is fitted inside the hooked part 160 of the wire 150.

Although the energy absorbing mechanism is described as including a wire that has a square cross-section, it is possible to provide an energy absorbing mechanism that includes a wire or a strap with different cross-section. Such cross-sections could include, but are not limited to, circular or rectangular cross-sections.

The reader will also see, in particular from FIG. 2, that the main body or elongate plate 138 of the second locking part 136 from which the anvil 156 protrudes co-operates with the side of the shroud 104 to define a slot 162 into which the wire 150 is located, helping to restrain the wire 150.

FIGS. 4 and 5 clearly show how the second locking part 136—and with it the energy absorbing mechanism deforming part 148 (and hence the second locking part 136), move with the upper shroud part 106 relative to the lower shroud part 108 between the full reach-in position of FIG. 4 and the full reach-out position of FIG. 5. Note that during this adjustment the first locking part 122 is moved away from the second locking part 136.

To prevent accidental activation of the energy absorbing mechanism 144 during adjustment, the assembly 100 includes an anti-abuse mechanism 164. This comprises a rocker arm 166 that pivots around a pivot point 168 having a first arm 170 that extends in one direction from the pivot 168 and engages the first locking part 122 and a locking finger 172 that extends in another direction away from the pivot 168 and moves up and down in opposition to the movement of the first locking part 122. When the first locking part 122 is raised the finger 172 is lowered and when the first locking part 122 is lowered the finger 172 is lifted. This finger 172 extends downwards to a level below a frangible blocking element 174 that is secured to the second locking part 136. The anti-abuse locking finger 172, when in the lowered position, will strike the anti-abuse blocking element 174 when the steering reaches the full reach-in position of FIG. 3. This prevents further movement that would otherwise cause the energy absorbing mechanism 144 to activate. Note that this only comes into play when the clamp mechanism 112 is unclamped.

The movement of the assembly during a crash is illustrated in FIGS. 6 to 9, although in these drawings a slightly modified arrangement is shown in which the energy absorption mechanism is configured with the lever 180, anvil 176 and wire arranged in a mirror image of the first embodiment about a horizontal axis. In so far as the function of this second embodiment is the same as the first the same reference numerals have been used for like parts for clarity.

FIGS. 6 and 7 show the assembly 100 when the clamp mechanism 112 is in the clamped position prior to a crash (FIG. 6) and after a crash (FIG. 7). Note that in FIGS. 6 and 7 the wire 150 and anvil 156 are inverted compared with FIGS. 3 to 5. This does not affect the function and is merely an alternative arrangement that the skilled person could choose.

As can be seen the first locking part 122 securely holds the second locking part 136 in a fixed position relative to the lower shroud part 106 once the two sets of teeth 130, 140 are engaged. This holds the anvil 156 of the energy absorbing mechanism 144 in place because it is integral with the second locking part 136. During a crash the upper shroud part 106 will start to move telescopically into the lower shroud part 108, and as this happens the end of the wire 150 that is welded to the upper shroud part 106 is dragged around the anvil 156 causing plastic deformation to occur along the wire 150 absorbing kinetic energy.

Figure 3:
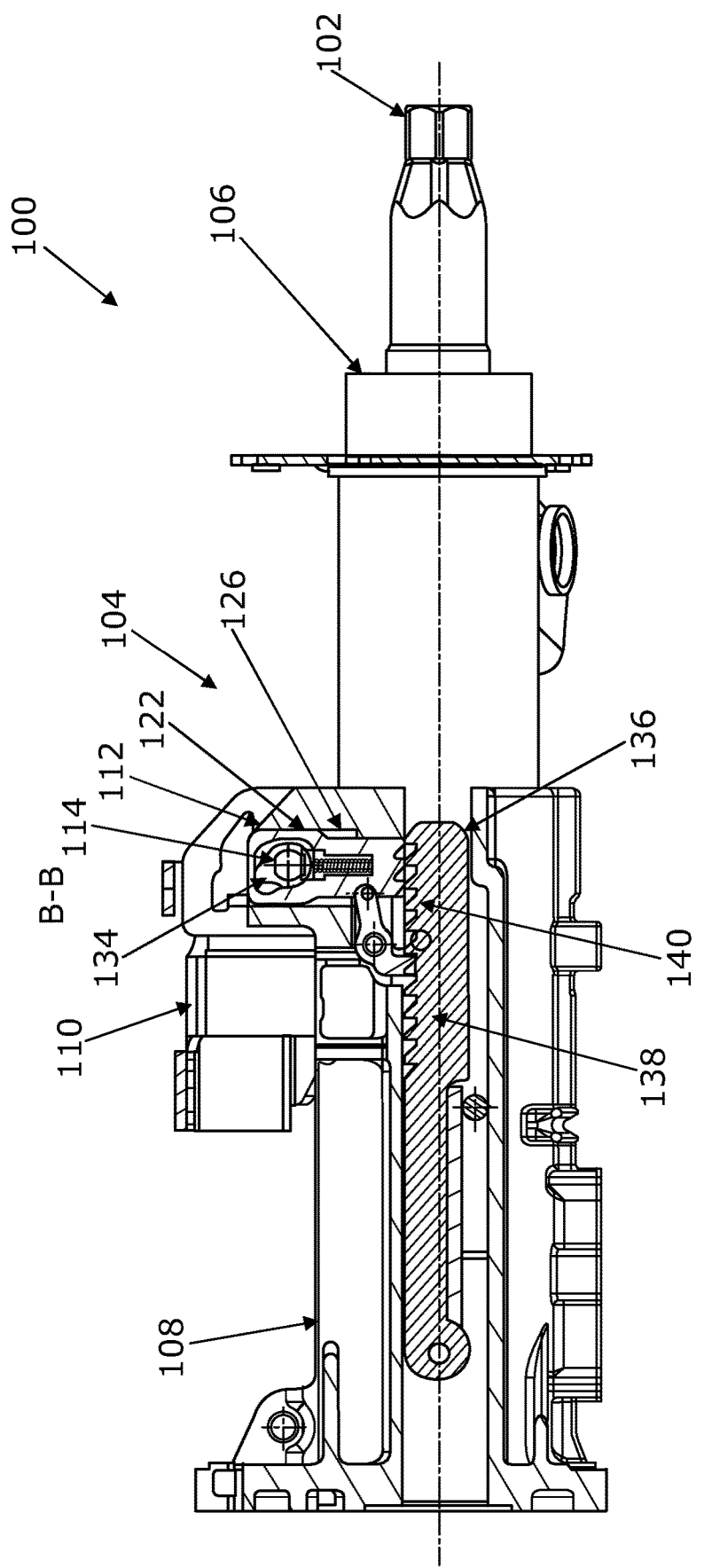
FIG. 3 is a view along the section B-B of the assembly of FIG. 1.

A further optional feature that can be seen in FIGS. 3 to 5 is a second anvil 176 defined by a tip 178 of a lever 180. The lever 180 is provided with a hole 182 at an end furthest from the steering wheel which fits onto a spindle 184 formed at the end of the second locking part 136 furthest from the steering wheel, and is held in a horizontal orientation by a support pin 186 that is located below the lever 180. The wire 150 extends along the upper side of the lever 180 before passing through a gap 188 between the tip 178 of the lever 180 and the first anvil 156 to form a chicane in the path of the wire 150. During adjustment of the assembly 100 for reach the lever 180 travels with the second locking part 136 and the upper shroud part 106 and as it does so it slides across the top of the pin 186.

In the inverse arrangement, as shown in FIGS. 6 to 9, the pin 186 prevents upward movement of the lever 180 in order to hold the lever 180 in a horizontal orientation. Furthermore, the wire 150 extends along the lower side of the lever 180 before passing through the gap 188. The skilled person will understand that this inverse arrangement will provide the same benefits as the non-inverse arrangement, and during adjustment the lever 180 will slide along the bottom of the pin 186.

Figure 8:
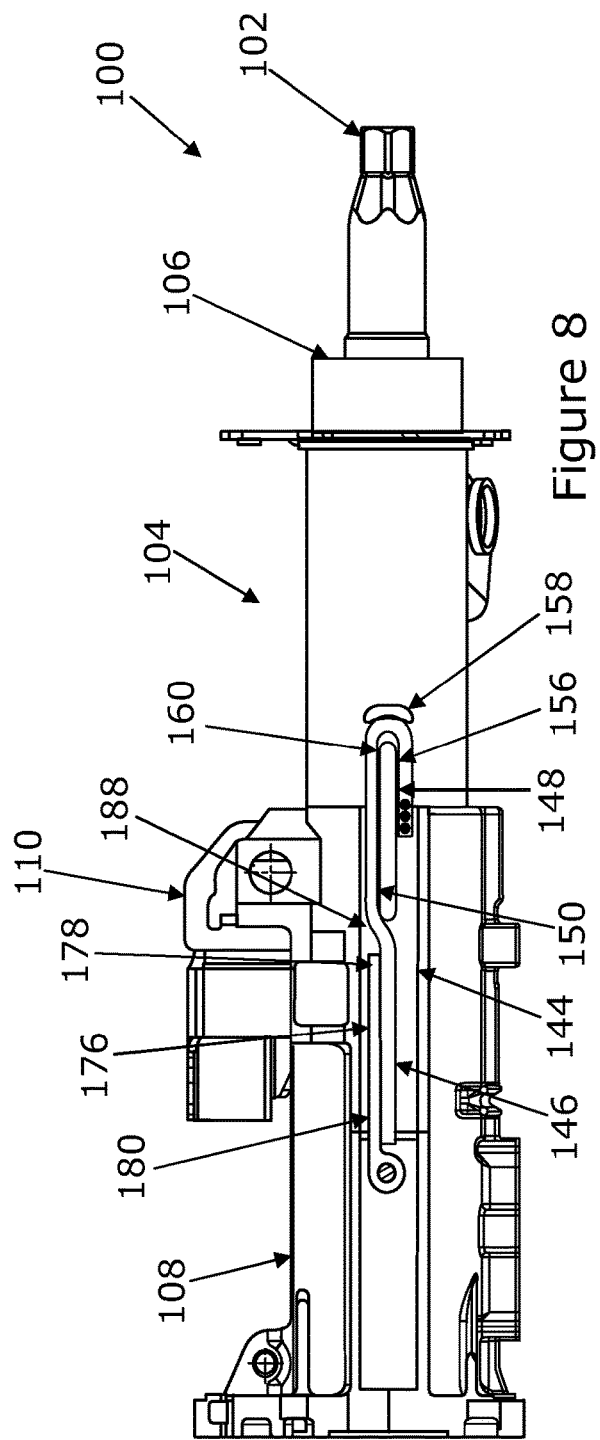
FIG. 8 is a view corresponding to FIG. 6 where the second anvil has been moved out of the way by activation of a pyrotechnic device.
Figure 9:
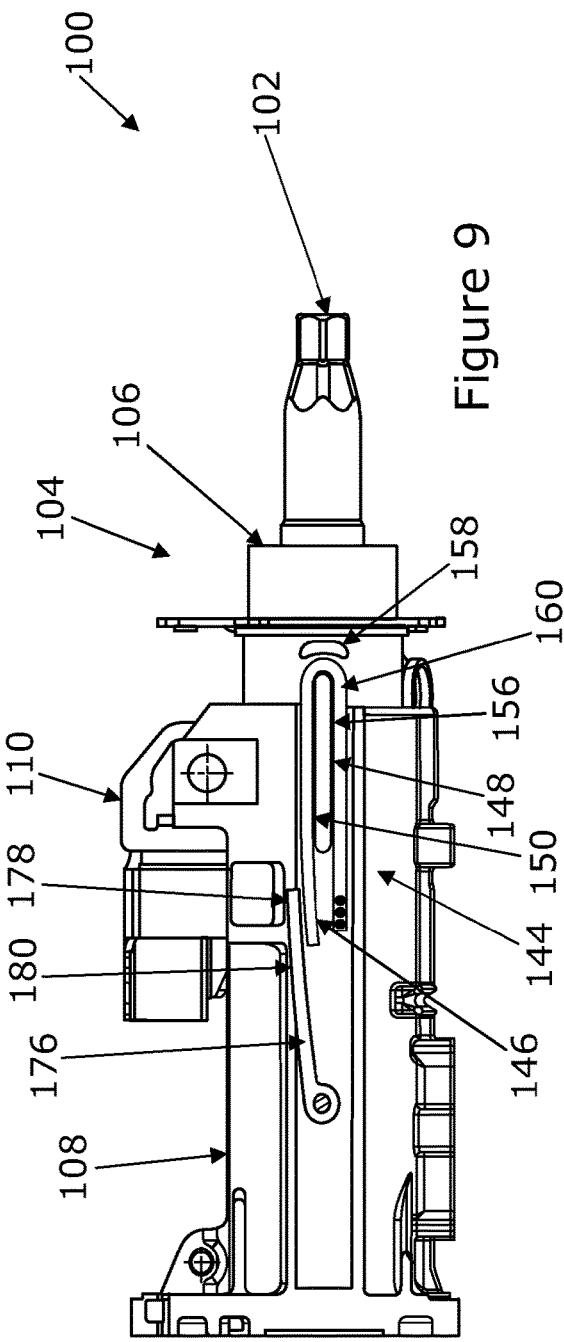
FIG. 9 shows the end position of the energy absorbing mechanism after a crash where the strap has been dragged over the first anvil only.

The support pin 186 is connected to a pyrotechnic device 190 that is secured to the lower shroud part 108. When the pyrotechnic device 190 is operated the support pin 186 retracts allowing the lever 180 to pivot around the spindle 184 to a second position as shown in FIG. 8. This changes the path around which the wire 150 has to deform, by opening up the previously tight chicane, and in effect reduces the amount of energy needed to deform the wire 150 as it moves to the collapsed position of FIG. 9.

The assembly shown in the drawings requires relatively few components whilst achieving the same energy absorbing characteristics for all reach positions.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A reach adjustable steering column assembly comprising:
    a telescopic steering shaft which in use supports a steering wheel of the vehicle; a shroud that supports the steering shaft comprising an upper shroud part and a lower shroud part, the upper shroud part moving telescopically relative to the lower part during reach adjustment of the steering column assembly,
    a support bracket that supports the shroud relative to the vehicle,
    a clamp mechanism that is operable between an unclamped position in which the steering column assembly is adjustable for reach and a clamped position in which a reach position of the steering column assembly is fixed, in which the clamp mechanism comprises a first locking part that is displaceable by an actuator assembly into and out of positive engagement with a second locking part, the first and second locking parts being engaged in the clamped position and disengaged in the unclamped position, the first locking part being fixed to one of the lower shroud part and the support bracket, and the second locking part during normal use being fixed to the upper shroud part so that the second locking part moves with the upper shroud part during reach adjustment but during a crash the second locking part being free to move relative to the upper shroud part, and an energy absorbing mechanism that acts between the upper shroud part and the second locking part and is configured so that during a crash whereby the upper shroud part moves telescopically relative to the lower shroud part with the clamp assembly in the clamped position a deformable part of the energy absorbing mechanism is plastically deformed by a deforming part, thereby controlling the movement of the upper shroud part, and in that one of the deformable part and the deforming part of the energy absorbing mechanism is secured to the upper shroud part, and the other is fixed relative to the second locking part; and wherein the second locking part is additionally or alternatively fixed to the upper shroud part by a frangible connector.

2. The reach adjustable steering column assembly as claimed in claim 1 wherein the second locking part is, during normal use, fusibly coupled to the upper shroud part.

3. The reach adjustable steering column assembly as claimed in claim 1 wherein the frangible connector prevents an accidental activation of the energy absorbing mechanism during reach adjustment but breaks in the event of a crash to allow relative movement between the upper shroud part and the second locking part whereby the energy absorbing mechanism can be activated.

4. The reach adjustable steering column assembly as claimed in claim 1 wherein, during collapse, the deformable part is fixed to the upper shroud part and the deforming part is fixed to the second locking part.

5. A reach adjustable steering column assembly comprising:

a telescopic steering shaft which in use supports a steering wheel of the vehicle; a shroud that supports the steering shaft comprising an upper shroud part and a lower shroud part, the upper shroud part moving telescopically relative to the lower part during reach adjustment of the steering column assembly, a support bracket that supports the shroud relative to the vehicle, a clamp mechanism that is operable between an unclamped position in which the steering column assembly is adjustable for reach and a clamped position in which a reach position of the steering column assembly is fixed, in which the clamp mechanism comprises a first locking part that is displaceable by an actuator assembly into and out of positive engagement with a second locking part, the first and second locking parts being engaged in the clamped position and disengaged in the unclamped position, the first locking part being fixed to one of the lower shroud part and the support bracket, and the second locking part during normal use being fixed to the upper shroud part so that the second locking part moves with the upper shroud part during reach adjustment but during a crash the second locking part being free to move relative to the upper shroud part, and an energy absorbing mechanism that acts between the upper shroud part and the second locking part and is configured so that during a crash whereby the upper shroud part moves telescopically relative to the lower shroud part with the clamp assembly in the clamped position a deformable part of the energy absorbing mechanism is plastically deformed by a deforming part, thereby controlling the movement of the upper shroud part, and in that one of the deformable part and the deforming part of the energy absorbing mechanism is secured to the upper shroud part, and the other is fixed relative to the second locking part;

wherein the deformable part comprises a plastically-deformable strap that is fixed at a leading end to the upper shroud part and has a trailing part that loops around a first anvil defined by the deforming part, during collapse the upper shroud part causing the leading part of the strap to drag the trailing part around the first anvil causing the strap to plastically deform.

6. The reach adjustable steering column assembly as claimed in claim 5 wherein the strap comprises a flat strip or a wire.

7. The reach adjustable steering column assembly as claimed in claim 5 wherein the deforming part is fixed to or is an integral part of the second locking part.

8. The reach adjustable steering column assembly as claimed in claim 7 wherein the second locking part comprises a block or plate and the first anvil around which the strap is pulled, the first anvil forming the deforming part.

9. The reach adjustable steering column assembly as claimed in claim 8 wherein the first anvil is provided on a side of the plate or block facing the shroud so that the deformable part is retained in a channel formed by the side of the plate or block and a side of the shroud and the first anvil.

10. The reach adjustable steering column assembly as claimed in claim 5 wherein the deforming part includes a second anvil that can be moved relative to the first anvil to change the path around which the strap is dragged.

11. The reach adjustable steering column assembly as claimed in claim 10 wherein the second anvil is fixed to or comprises an end portion of a lever that is pivotably fixed to the second locking part.

12. A reach adjustable steering column assembly comprising:

a telescopic steering shaft which in use supports a steering wheel of the vehicle; a shroud that supports the steering shaft comprising an upper shroud part and a lower shroud part, the upper shroud part moving telescopically relative to the lower part during reach adjustment of the steering column assembly, a support bracket that supports the shroud relative to the vehicle, a clamp mechanism that is operable between an unclamped position in which the steering column assembly is adjustable for reach and a clamped position in which a reach position of the steering column assembly is fixed, in which the clamp mechanism comprises a first locking part that is displaceable by an actuator assembly into and out of positive engagement with a second locking part, the first and second locking parts being engaged in the clamped position and disengaged in the unclamped position, the first locking part being fixed to one of the lower shroud part and the support bracket, and the second locking part during normal use being fixed to the upper shroud part so that the second locking part moves with the upper shroud part during reach adjustment but during a crash the second locking part being free to move relative to the upper shroud part, an energy absorbing mechanism that acts between the upper shroud part and the second locking part and is configured so that during a crash whereby the upper shroud part moves telescopically relative to the lower shroud part with the clamp assembly in the clamped position a deformable part of the energy absorbing mechanism is plastically deformed by a deforming part, thereby controlling the movement of the upper shroud part, and in that one of the deformable part and the deforming part of the energy absorbing mechanism is secured to the upper shroud part, and the other is fixed relative to the second locking part; and an anti-abuse mechanism for preventing engagement of the energy absorbing mechanism when the clamp mechanism is in an unclamped position.

13. The reach adjustable steering column assembly as claimed in claim 12 wherein the anti-abuse mechanism comprises a rocker arm that pivots around a pivot point having a first arm that extends in one direction from the pivot point and engages the first locking part and a locking finger that extends in another direction away from the pivot point and moves up and down in opposition to the movement of the first locking part such that when the first locking part is raised the finger is lowered and when the first locking part is lowered the finger is lifted.

14. The reach adjustable steering column assembly as claimed in claim 13 wherein the finger of the anti-abuse mechanism extends downwards to a level below a frangible blocking element that is secured to the second locking part.

15. The reach adjustable steering column assembly as claimed in claim 1 wherein the lower shroud part includes a feature on one side which locates the second locking part such that the second locking part can slide axially relative to the lower shroud part as the upper shroud part is moved telescopically relative to the lower shroud part.

16. The reach adjustable steering column assembly as claimed in claim 1 wherein the upper shroud part fits within the lower shroud part.

* * * * *